(12) United States Patent
Shiotani

(10) Patent No.: US 11,942,847 B2
(45) Date of Patent: Mar. 26, 2024

(54) STATOR, MOTOR, AND VENTILATION DEVICE

(71) Applicant: Panasonic Intellectual Property Management Co., Ltd., Osaka (JP)

(72) Inventor: Yasuhito Shiotani, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 442 days.

(21) Appl. No.: 17/291,654

(22) PCT Filed: Oct. 31, 2019

(86) PCT No.: PCT/JP2019/042799
§ 371 (c)(1),
(2) Date: May 6, 2021

(87) PCT Pub. No.: WO2020/110591
PCT Pub. Date: Jun. 4, 2020

(65) Prior Publication Data
US 2021/0408860 A1 Dec. 30, 2021

(30) Foreign Application Priority Data
Nov. 26, 2018 (JP) ................................. 2018-219844

(51) Int. Cl.
*H02K 3/50* (2006.01)
*F24F 13/20* (2006.01)
*H02K 5/22* (2006.01)

(52) U.S. Cl.
CPC ............... *H02K 3/50* (2013.01); *F24F 13/20* (2013.01); *H02K 5/225* (2013.01); *F24F 2013/205* (2013.01)

(58) Field of Classification Search
CPC ....................................................... H02K 3/50
See application file for complete search history.

(56) References Cited

U.S. PATENT DOCUMENTS 6,031,307 A * 2/2000 Ohshita .............. H02K 15/0056
310/71
10,158,268 B2 * 12/2018 Fujii ...................... H02K 5/225
(Continued)

FOREIGN PATENT DOCUMENTS

CN 109274229 A * 1/2019 ........... H02K 15/085
JP H06-169541 A 6/1994
(Continued)

OTHER PUBLICATIONS

International Search Report for corresponding Application No. PCT/JP2019/042799, dated Dec. 24, 2019.

*Primary Examiner* — Robert W Horn
(74) *Attorney, Agent, or Firm* — Renner, Otto, Boisselle & Sklar, LLP

(57) ABSTRACT

A Stator includes: an iron core formed in an annular shape; winding wound around the iron core; an insulator (3) configured to insulate the iron core from the winding; a substrate (6); and a terminal pin (12) configured to connect the winding to the substrate (6). The substrate (6) includes a through hole configured to penetrate the substrate (6) and cause an iron-core facing face (6a) and a back face (6b) to communicate. The terminal pin (12) includes: with the terminal pin (12) penetrating the through hole, an upper connection part (5a) provided at a distance from the back face (b) in a direction opposite to the iron core and connected to the winding; and a lower connection part (5b) provided in the vicinity of the through hole, arranged independently of the upper connection part (5a), and connected to the substrate (6).

11 Claims, 8 Drawing Sheets

(56) References Cited

U.S. PATENT DOCUMENTS

| | | | |
|---|---|---|---|
| 2009/0121566 A1* | 5/2009 | Ishizeki | H02K 5/225 |
| | | | 310/71 |
| 2010/0033065 A1* | 2/2010 | Fujii | H05K 3/3447 |
| | | | 310/179 |
| 2021/0408860 A1* | 12/2021 | Shiotani | F24F 13/20 |

FOREIGN PATENT DOCUMENTS

| | | | | |
|---|---|---|---|---|
| JP | H06-057062 U | | 8/1994 | |
| JP | H08-149734 A | | 6/1996 | |
| JP | H08-223843 A | | 8/1996 | |
| JP | H09-131013 A | | 5/1997 | |
| JP | H09-308163 A | | 11/1997 | |
| JP | H11-187603 A | | 7/1999 | |
| JP | 2002-190405 A | | 7/2002 | |
| JP | 2008011650 A | * | 1/2008 | |
| JP | 2009-118613 A | | 5/2009 | |
| JP | 2017-221035 A | | 12/2017 | |
| WO | WO-2008041672 A1 | * | 4/2008 | H02K 11/33 |

\* cited by examiner

STATOR, MOTOR, AND VENTILATION DEVICE

TECHNICAL FIELD

The present disclosure relates to a stator, a motor, and a ventilation device.

BACKGROUND ART

It is known that, in a conventional motor, for example, solder is used to electrically bond a winding terminal of a stator and a terminal pin of the stator in a terminal connection part, and is used to connect the terminal connection part and a substrate having a lead line leading to a power source. Furthermore, it is known that, in the case where the winding terminal is made of aluminum wire, a coating is applied thereto to isolate the outside air for the prevention of electrolytic corrosion.

The configuration of such state will be described below with reference to FIG. 9 illustrating a partial cross-sectional view of a connection part of the conventional motor.

As illustrated in FIG. 9, terminal connection part 114 is formed in such a manner that winding terminal 112 is wound around terminal pin 111 and joined to terminal pin 111 by terminal connection solder 113. Furthermore, terminal connection part 114 is connected, by solder 117, to substrate connection part 116 leading to a lead line of substrate 115. For preventing electrolytic corrosion of aluminum wire, terminal connection part 114 is entirely covered with coating 118 to isolate connection part 114 from the outside air.

CITATION LIST

Patent Literature 1: Unexamined Japanese Patent Publication No. 2017-221035

SUMMARY OF INVENTION

In the above-described conventional connection and protection method, a winding terminal and a terminal pin connected to each other at the previous step are covered with solder to connect the terminal pin to a substrate, and therefore, it is difficult to determine the finished quality of the existing connection part, or, in the case of aluminum wire connection, accuracy in filling a coating material cannot be visually checked, and thus to perform a nondestructive check with accuracy is difficult.

Furthermore, there is a problem that a solder part connecting the winding terminal and the terminal pin is heated again when soldering for connecting the terminal pin to the substrate is performed, and this causes the lack of quality stability. Therefore, a connection structure capable of quality stabilization has been desired.

To achieve this object, a stator according to the present disclosure includes: an iron core formed in an annular shape; a winding wound around the iron core; an insulator configured to insulate the iron core from the winding; a substrate; and a terminal pin configured to connect the winding to the substrate. The substrate includes a through hole configured to penetrate the substrate and cause an iron-core facing face facing the iron core and a back face opposite to the iron-core facing face to communicate. The terminal pin includes: with the terminal pin penetrating the through hole, an upper connection part positioned at a distance from the back face in a direction opposite to the iron core and connected to the winding; and a lower connection part connected to the substrate in the vicinity of the through hole independently of the upper connection part. Thus, the desired object is achieved.

According to the present disclosure, enhanced productivity resulting from an improvement in workability owing to ease of stator manufacture and enhanced quality resulting from visualization of finished quality can be expected.

DESCRIPTION OF EMBODIMENTS

Figure 1:
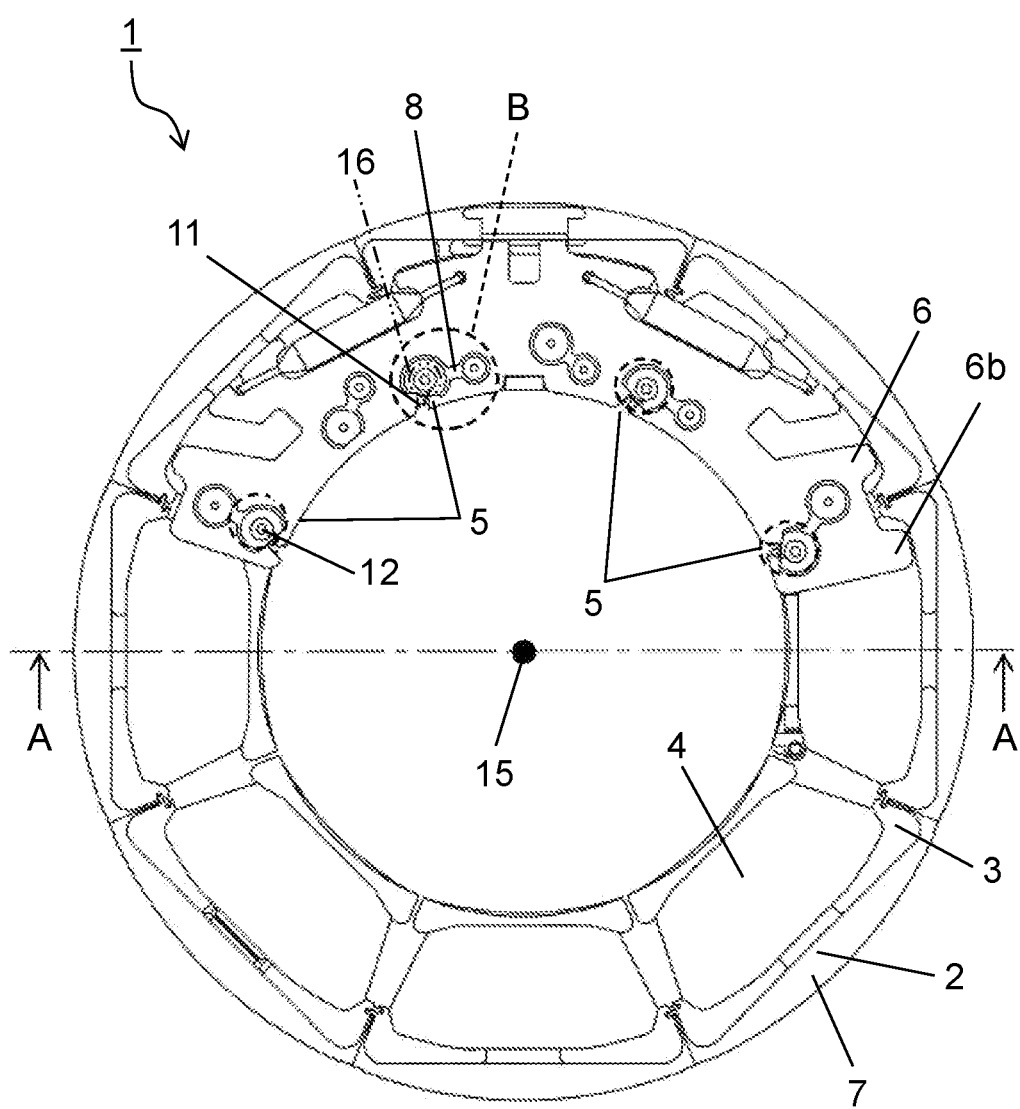
FIG. 1 is a plan view of a stator according to an embodiment of the present disclosure.

Hereinafter, embodiments of the present disclosure will be described with reference to the drawings. The following embodiments are merely specific examples of the present disclosure, and do not limit the technical scope of the present disclosure. In all of the drawings, the same constituent elements are given the same reference numerals, respectively, and repetition of the same descriptions thereof is avoided. Furthermore, in each of the drawings, detailed descriptions of constituent elements that are not directly related to the present disclosure are omitted.

Embodiment

Embodiments of the present disclosure will be described with reference to the drawings.

Figure 2:
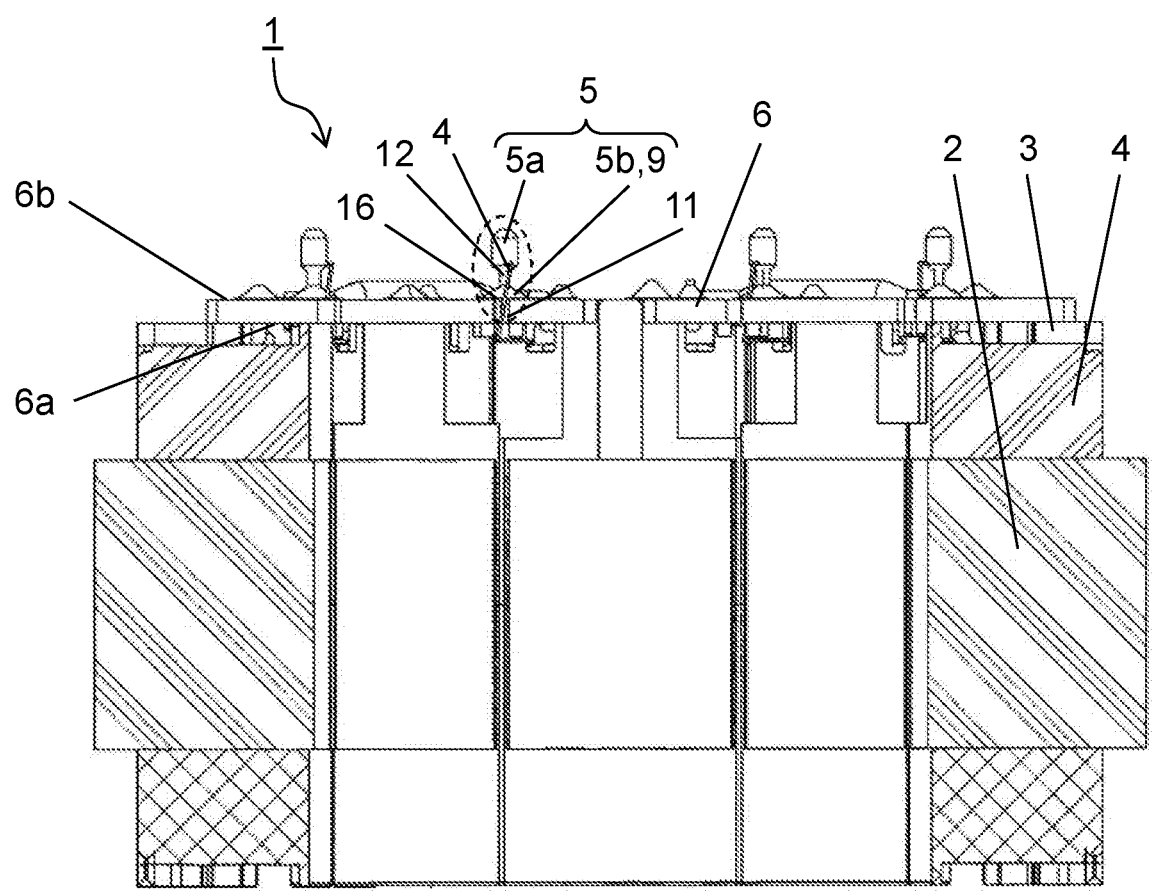
FIG. 2 is a partial cross-sectional view of the stator according to the embodiment of the present disclosure.

First, stator 1 according to the present embodiment will be described using FIG. 1 and FIG. 2. Note that FIG. 1 is a plan view of stator 1 according to the present embodiment, and FIG. 2 is a cross-sectional view of stator 1, the view taken along line A-A in FIG. 1.

Figure 7:
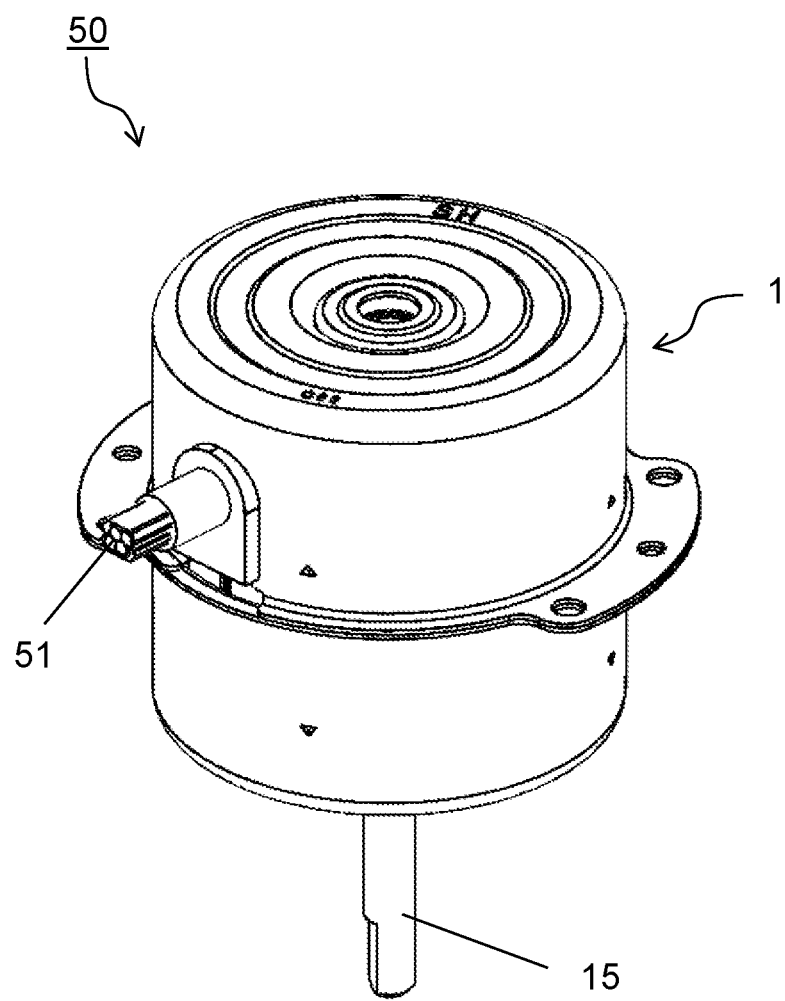
FIG. 7 is a perspective view of a motor according to an embodiment of the present disclosure.
Figure 8A:
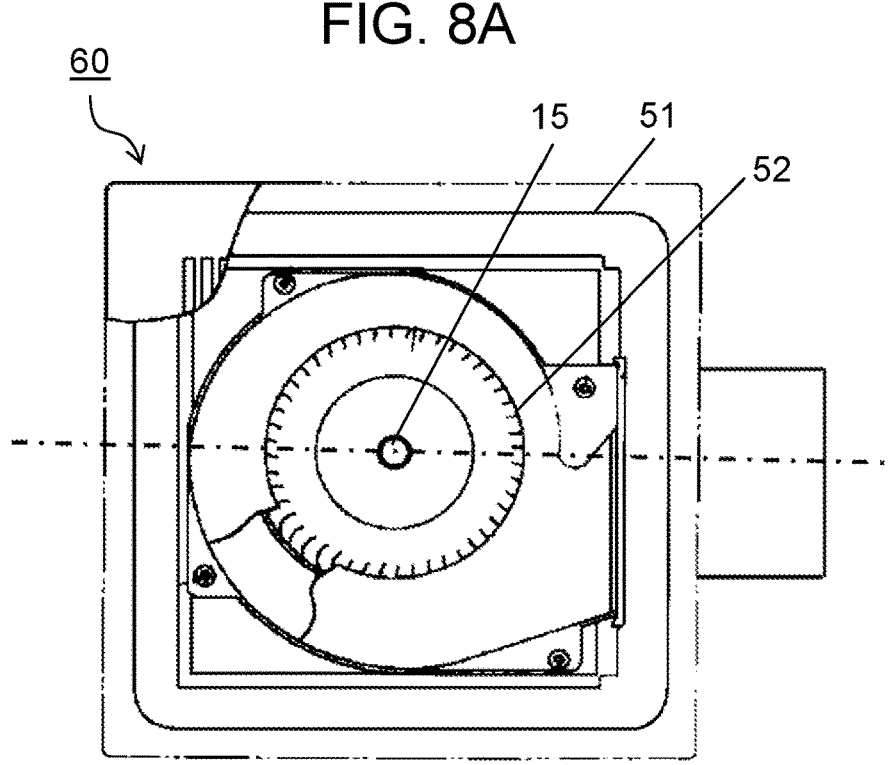
FIG. 8A is a bottom view of a ventilation device according to an embodiment of the present disclosure.
Figure 8B:
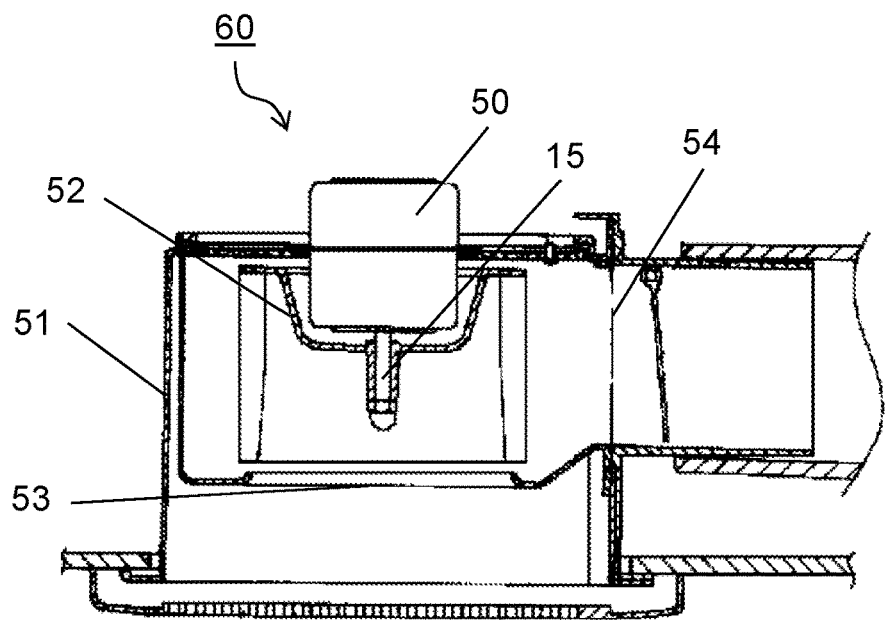
FIG. 8B is a side cross-sectional view of the ventilation device according to the embodiment of the present disclosure.
Figure 9:
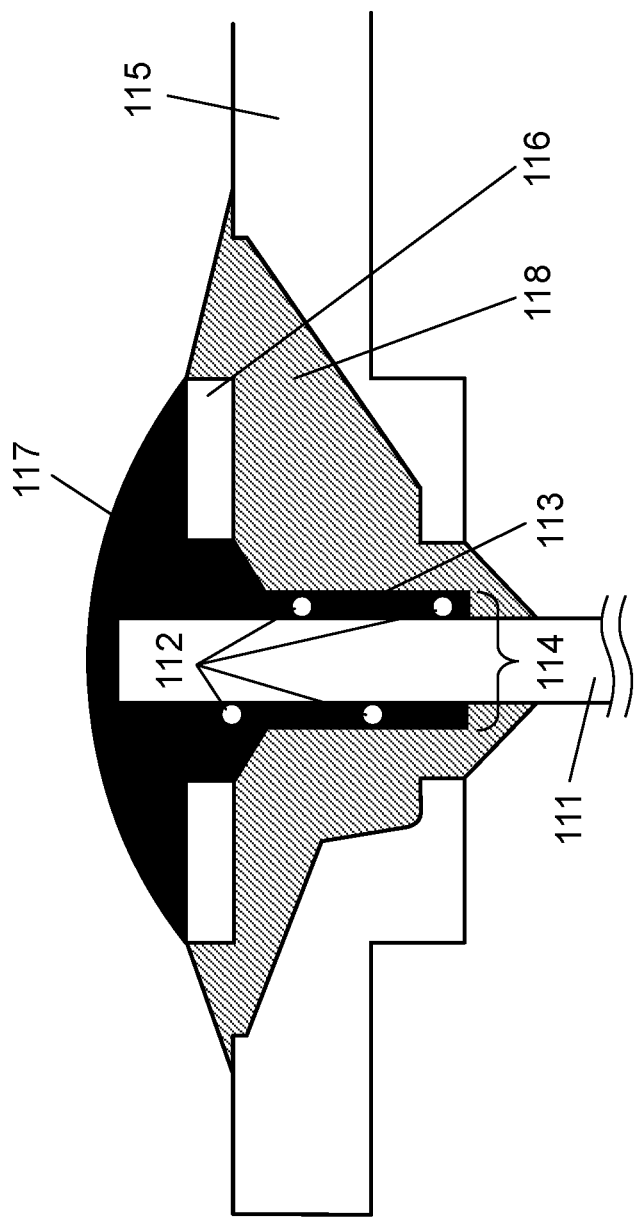
FIG. 9 is a schematic view illustrating a state of a conventional winding.

Stator 1 is provided as a component constituting a part of motor 50 (see FIG. 7) provided in ventilation device 60 (see FIG. 8A and FIG. 8B). Stator 1 includes iron core 2 serving as a stator core, insulator 3, winding 4, terminal pin 12, and substrate 6.

Iron core 2 is formed by annularly connecting a plurality of split iron cores each of which is formed by uniting yoke part 7 positioned in the outer periphery of stator 1 and a tooth part (not illustrated) protruding from yoke part 7 toward the inner periphery of stator 1. Iron core 2 is formed in such a manner that the split cores linearly arranged by uniting adjoining yoke parts 7 are processed into an annular shape, or the split cores each formed as an independent object are annularly connected to each other at yoke parts 7. Rotating shaft 15 of a not-illustrated rotor is positioned at the center of the annular shape of iron core 2.

Insulator 3 is configured to cover mainly a range from yoke part 7 of iron core 2 to the tooth part thereof. Winding 4 is wound around a plurality of the tooth parts via insulator 3. That is, insulator 3 has the function of electrically insulating iron core 2 from winding 4. Insulator 3 includes rib 13 (see FIG. 3 to FIG. 6), and details thereof will be described later.

Winding 4 is an electrically conductive wire mainly made of a copper or aluminum alloy, and wound around iron core 2 via insulator 3. Note that winding 4 has different winding specifications, depending on required specifications.

Terminal pin 12 is provided so as to stand on the top face of insulator 3, that is, on a face of insulator 3 that faces substrate 6, in the direction of substrate 6 and to be in parallel with rotating shaft 15. Terminal pin 12 is formed mainly of an electrically conductive material, and, when electrically connected to copper foil 8 on substrate 6 and winding 4, terminal pin 12 establishes an electrically connection between substrate 6 and winding 4. Terminal pin 12 includes terminal connection part 5.

Substrate 6 includes a plurality of electric contact points, copper foil for connecting the electric contact points, and through hole 16 through which terminal pin 12 penetrates. Substrate 6 is configured to connect, for example, an external inverter circuit to winding 4. In the present embodiment, substrate 6 has an outline in the form of a part of a toroidal shape, the part having a central angle of approximately 160 degrees. In other words, substrate 6 has a partial doughnut shape. Substrate 6 is disposed on a plane perpendicular to rotating shaft 15, at a predetermined distance from iron core 2 in the direction of rotating shaft 15, so as to bring the center of substrate 6 into agreement with the center of rotating shaft 15. Substrate 6 includes: iron-core facing face 6a facing iron core 2; and back face 6b opposite to iron-core facing face 6a. In FIG. 2, iron-core facing face 6a is a lower face of substrate 6, and back face 6b is an upper face of substrate 6. Substrate 6 further includes: through hole 16 via which iron-core facing face 6a and back face 6b communicate; and slit 11 communicating with through hole 16.

The inner periphery of through hole 16 and surroundings thereof are provided with copper foil serving as an electrically conductive material.

Terminal connection part 5 is formed on terminal pin 12, and includes upper connection part 5a and lower connection part 5b.

Upper connection part 5a is a part configured to electrically connect a winding terminal of winding 4 to terminal pin 12. With terminal pin 12 penetrating from iron-core facing face 6a to back face 6b, upper connection part 5a is provided at an end, on back face 6b side, of terminal pin 12. In other words, upper connection part 5a is provided at a distance from back face 6b in a direction opposite to iron core 2. In the present embodiment, as an example of a method for connecting winding 4 to terminal pin 12 in upper connection part 5a, soldering is mentioned, but the connection method is not limited to a particular one, and may be arc welding, laser joining, or fusing joining.

Lower connection part 5b is a part configured to electrically connect the electrically conductive material provided in the inner periphery of through hole 16 to terminal pin 12. Lower connection part 5b is provided in the vicinity of through hole 16, and is configured to electrically connect terminal pin 12 to substrate 6 by pouring and applying solder from the back face 6b side into through hole 16 provided in FIG. 2 in the present embodiment.

Upper connection part 5a and lower connection part 5b are preferably isolated from each other, in other words, independently disposed. Thus, during the formation of lower connection part 5b, the heat of lower connection part 5b can be prevented from affecting upper connection part 5a, and furthermore affecting the connection between terminal pin 12 and winding 4. Note that upper connection part 5a and lower connection part 5b are not necessarily perfectly isolated from each other, and, in the case where the upper end of lower connection part 5b is in slight contact with the lower end of upper connection part 5a, it can be determined that there is no heat influence, and hence such case falls into the isolation in the present embodiment.

Figure 3:
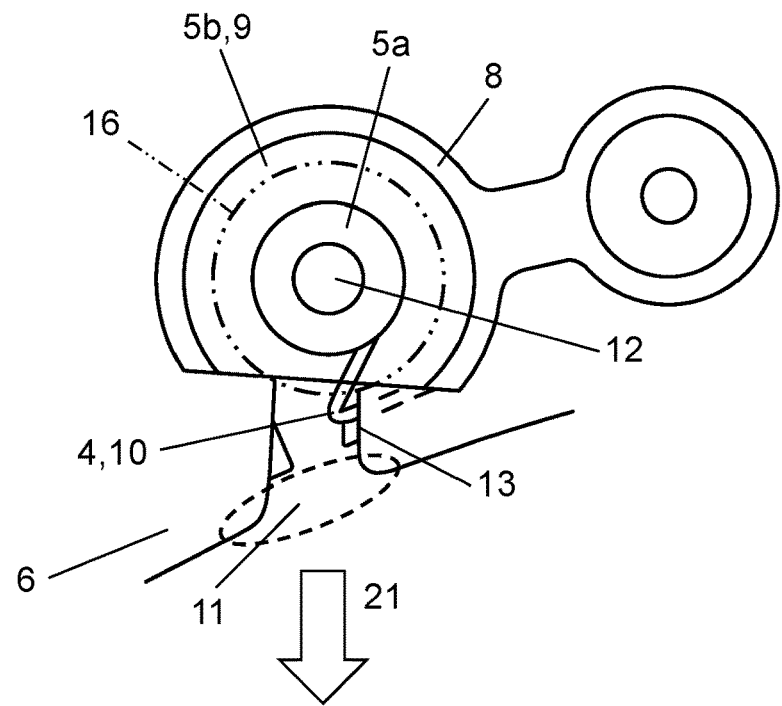
FIG. 3 is a partially enlarged view of the stator according to the embodiment of the present disclosure.
Figure 4:
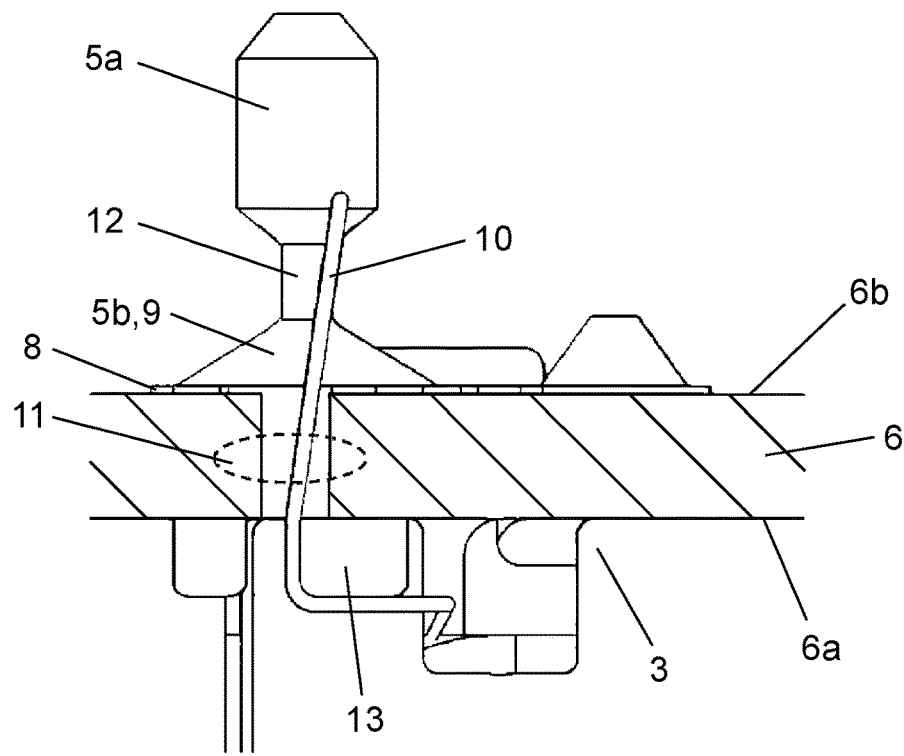
FIG. 4 is a partial cross-sectional view of the stator according to the embodiment of the present disclosure.
Figure 5:
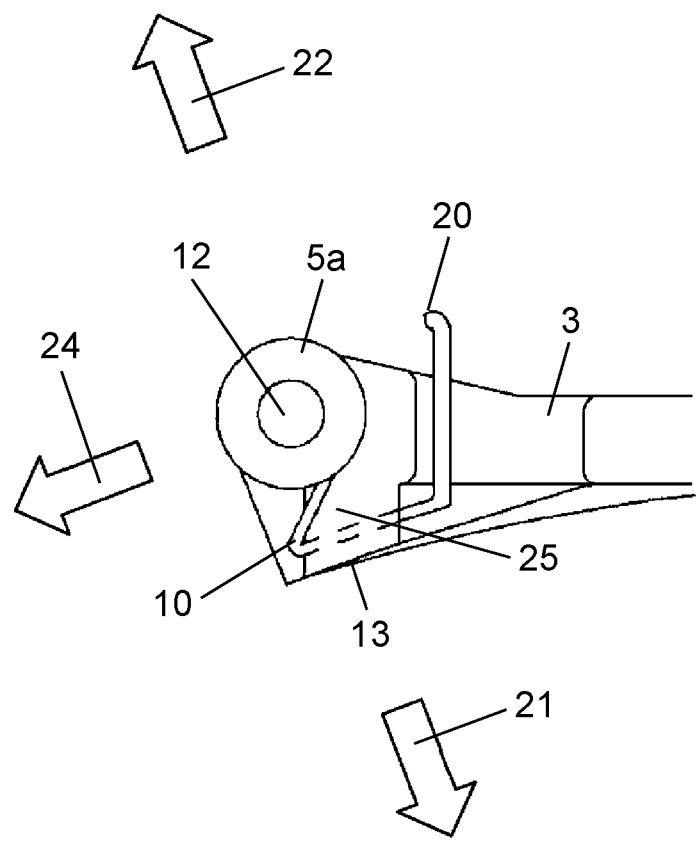
FIG. 5 is an enlarged top view of a slit according to the embodiment of the present disclosure.
Figure 6:
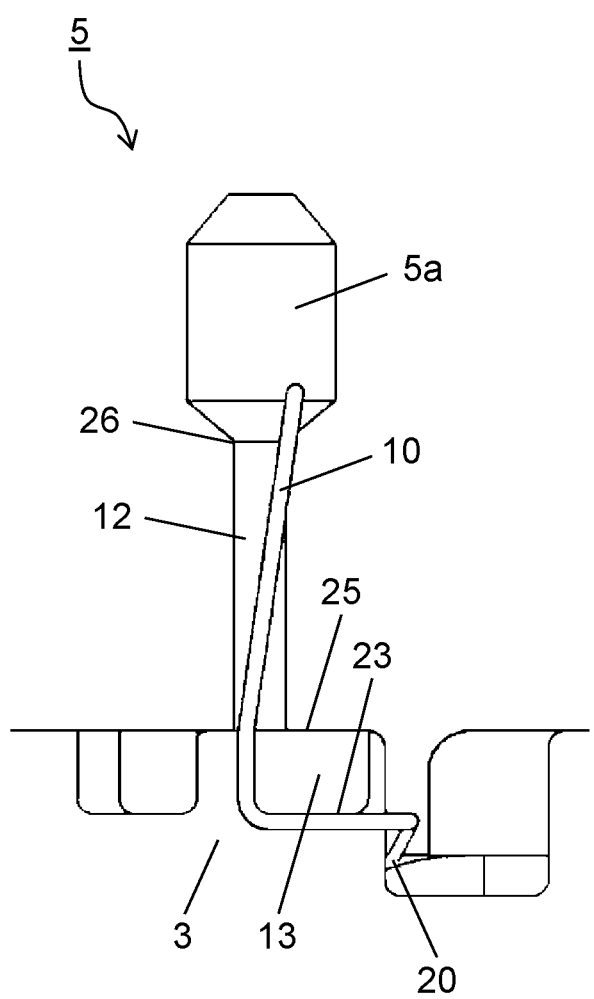
FIG. 6 is an enlarged side view of the slit according to the embodiment of the present disclosure.

Details of configurations of substrate 6 and terminal connection part 5 will be described using FIG. 3 to FIG. 6. FIG. 3 is a partially enlarged view of the stator, FIG. 4 is a partial cross-sectional view of the stator, FIG. 5 is an enlarged top view of the slit, and FIG. 6 is an enlarged side view of the slit. Note that FIG. 3 is an enlarged view of part B in FIG. 1. Furthermore, the top view means a case in which substrate 6 is viewed from the back face 6b of substrate 6.

As illustrated in FIG. 3, substrate 6 includes slit 11 formed by cutting out a part of substrate 6 toward rotating shaft 15 and connected to through hole 16.

Slit 11 is provided in through hole 16 so as to be opened in inner peripheral direction 21 of the annular shape of iron core 2. The opening width of slit 11 is, for example, smaller than the diameter of through hole 16.

Rib 13 is provided in insulator 3, and functions as a guide for guiding terminal wire 10 of winding 4 to slit 11. Rib 13 is provided in the vicinity of terminal pin 12 in insulator 3, and in the upper face of insulator 3, the upper face facing iron-core facing face 6a of substrate 6. Rib 13 extends from the vicinity of the inner periphery of insulator 3 toward the center of iron core 2. Rib 13 is disposed so as to be capable of being visually observed through slit 11 in the top view illustrated in FIG. 3, when substrate 6 is disposed. In other words, rib 13 is not entirely hidden behind substrate 6 in the top view, but, rib 13 is disposed so that a part of rib 13 protrudes toward the slit space from one of facing sides of slit 11. In other words, in a state in which insulator 3 and substrate 6 are combined, at least a part of rib 13 is positioned under slit 11.

Next, an assembly procedure of stator 1 will be described using FIG. 3 to FIG. 6.

First, after winding 4 is wound around iron core 2, terminal wire 10 is drawn from insulator 3 toward substrate 6 as illustrated in FIG. 5 and FIG. 6. Starting position 20 for the drawing of terminal wire 10 is preferably a position at the same distance from the center of iron core 2 in the radial direction as the distance between the center of iron core 2 and terminal pin 12, or a position closer to the outer peripheral side than terminal pin 12. Terminal wire 10 is drawn out from starting position 20 in inner peripheral direction 21, and laid under lower face 23 of rib 13, that is, a face closer to iron core 2, and drawn in terminal pin direction 24. Subsequently, after terminal wire 10 passes through lower face 23, terminal wire 10 is drawn to upper face 25 of rib 13, that is, toward an end of terminal pin 12, and drawn in outer peripheral direction 22 and wound around approximately the end of terminal pin 12. Thus, terminal wire 10 is guided to terminal pin 12 by rib 13 in outer peripheral direction 22 from inner peripheral direction 21, and in other words, the direction of terminal wire 10 is fixed.

Under this state, terminal pin 12 and winding 4 are fixed at the end of terminal pin 12, for example, by solder. At the time of fixing terminal pin 12 and winding 4, if winding 4 is covered with, for example, a protective coating, the protective coating may be removed in advance from a part of winding 4, the part being to be wound around terminal pin 12. In the case where winding 4 is, for example, an aluminum wire, a coating for prevention of electrolytic corrosion may be applied to upper connection part 5a in order to avoid electrolytic corrosion in a connection between different metals. Thus, upper connection part 5a is formed into a state illustrated FIG. 6. At this time, lower end 26 of upper connection part 5a is sufficiently isolated from the upper face of insulator 3 and is also sufficiently isolated from back face 6b of substrate 6.

After upper connection part 5a is formed, substrate 6 is disposed from the terminal pin 12 end side, that is, from the upper connection part 5a side toward insulator 3 so as to make the center of through hole 16 of substrate 6 coincide with the center of terminal pin 12. At this time, since the diameter of upper connection part 5a is smaller than the diameter of through hole 16, upper connection part 5a passes through hole 16. Terminal wire 10 is drawn from the outside the outer peripheral edge of upper connection part 5a, but, the direction of terminal wire 10 is fixed by rib 13, and therefore, without contact between substrate 6 and terminal wire 10, terminal wire 10 can pass through slit 11. The positional relation between slit 11 and rib 13 at the time of disposing substrate 6 can be checked from either the right or left side of slit 11 or both sides of slit 11, when viewed from the back side. This prevents one side of slit 11 from contacting terminal wire 10 due to a positional discrepancy of substrate 6 at the time of disposing substrate 6, and the risk of damaging terminal wire 10 due to the contact can be avoided, and terminal wire 10 can be more easily guided to slit 11

After substrate 6 is disposed, connecting solder 9 is applied above through hole 16, that is, to the surroundings of terminal pin 12 from the back face 6b side. Thus, lower connection part 5b configured to electrically connect terminal pin 12 and the copper foil of through hole 16 is formed. At this time, connecting solder 9 may be or may not be in contact with terminal wire 10. Note that, in particular, in the case where winding 4 is an aluminum wire covered with a coating and connecting solder 9 is in contact with terminal wire 10, it is beneficial that solder used for lower connection part 5b is made of a material having a lower melting point than that of the coating. This allows the coating to be maintained even during the solder connection of lower connection part 5b, and thus can prevent undesired electrolytic corrosion.

Here, the positional relation between upper connection part 5a and lower connection part 5b is such that upper connection part 5a is positioned above lower connection part 5b. Furthermore, upper connection part 5a is isolated so as not to contact connecting solder 9 used after substrate 6 is disposed, or so as not to be affected by thermal load even when upper connection part 5a contacts connection solder 9. With this configuration, upper connection part 5a after the fixing of terminal pin 12 and winding 4 is not heated again, and therefore, the connection can be stabilized. In the case where, for example, an aluminum wire is employed for winding 4, upper connection part 5a may be isolated from the outside air by coating. In the present configuration, the outer periphery of upper connection part 5a having the risk of electrolytic corrosion is not further covered with, for example, solder, and accordingly upper connection part 5a can be easily visually observed, and therefore, quality, such as the presence or absence and the state of a coating, can be more easily checked during processing, whereby enhanced productivity and enhanced quality can be expected.

FIG. 7 is a perspective view of motor 50 according to an embodiment of the present disclosure.

As illustrated in FIG. 7, motor 50 includes stator 1, rotating shaft 15, and lead wire 51. Motor 50 is supplied with electric power via lead wire 51 to rotate rotating shaft 15 of a rotor. Examples of motor 50 include a brushless DC motor. As described above, the present disclosure can realize motor 50 including stator 1. In other words, the use of stator 1 makes it possible to realize motor 50 having enhanced productivity and enhanced quality.

FIG. 8A is a bottom view of ventilation device 60 according to an embodiment of the present disclosure. FIG. 8B is a side cross-sectional view of ventilation device 60 according to the embodiment of the present disclosure.

As illustrated in FIG. 8A and FIG. 8B, ventilation device 60 includes motor 50, casing 51, and blades 52. Casing 51 includes inlet port 53 and outlet port 54. Ventilation device 60 is configured to inhale air from inlet port 53 and discharge the inhaled air from outlet port 54 when rotating shaft 15 rotates blade 52. Examples of ventilation device 60 include a sirocco fan. As described above, the present disclosure can realize ventilation device 60 including motor 50 including stator 1. In other words, the use of stator 1 makes it possible to realize ventilation device 60 having enhanced productivity and enhanced quality.

MODIFICATION

Note that, in the present embodiment, terminal connection part 5 is provided on the rotating shaft 15 side of substrate 6, in other words, provided in inner peripheral direction 21 of the annular shape to be closer to the center, but, terminal connection part 5 may be provided on the outer diameter side of the annular shape, in other words, provided in the vicinity of yoke part 7. In this case, rib 13 and slit 11 are also preferably provided in outer peripheral direction 22 of the annular shape. When provided on the outer peripheral side of the annular shape, rib 13 extends toward the outer periphery, accordingly.

INDUSTRIAL APPLICABILITY

The stator and others according to the present disclosure can realize enhanced productivity resulting from an improvement in workability owing to ease of stator manufacture and realize enhanced quality resulting from visualization of finished quality, and are therefore useful for a motor used for home electrical appliances, such as a ventilation device.

REFERENCE MARKS IN THE DRAWINGS

1 . . . stator
2 . . . iron core
3 . . . insulator
4 . . . winding
5, 114 . . . terminal connection part
5a . . . upper connection part
5b . . . lower connection part
6, 115 . . . substrate 6a . . . iron-core facing face
6b . . . back face
7 . . . yoke part
8 . . . copper foil
9 . . . connecting solder
10 . . . terminal wire
11 . . . slit
12, 111 . . . terminal pin
13 . . . rib
15 . . . rotating shaft
16 . . . through hole
20 . . . starting position
21 . . . inner peripheral direction
22 . . . outer peripheral direction
23 . . . lower face
24 . . . terminal pin direction
25 . . . upper face
26 . . . lower end
50 . . . motor
60 . . . ventilation device

The invention claimed is:

1. A stator, comprising:
an iron core formed in an annular shape;
a winding wound around the iron core;
an insulator configured to insulate the iron core from the winding;
a substrate;
a terminal pin configured to connect the winding to the substrate;
an upper connection part configured to electrically connect the winding to the terminal pin; and
a lower connection part configured to electrically connect the terminal pin and the substrate,
wherein the substrate includes
a through hole configured to penetrate the substrate and cause an iron-core facing face of the substrate and a back face of the substrate to communicate, the iron-core facing face facing the iron core, the back face being opposite to the iron-core facing face,
the upper connection part is provided
at a distance from the back face in a direction opposite to the iron core in an outer periphery of the terminal pin, and
the lower connection part is provided in an upper part of the through hole on the back face side in the outer periphery of the terminal pin, arranged independently of the upper connection part.

2. The stator according to claim 1,
wherein
the through hole has a diameter which is larger than a diameter of the upper connection part, and
the substrate includes
a slit formed by cutting out a part of the substrate, and connected to the through hole.

3. The stator according to claim 2,
wherein the slit is provided in the through hole on an inner peripheral side of the annular shape of the iron core.

4. The stator according to claim 2,
wherein the slit is provided in the through hole on an outer peripheral side of the annular shape of the iron core.

5. The stator according to claim 2,
wherein the insulator includes
a rib provided in a face of the insulator, the face facing the iron-core facing face, the rib being configured to guide the winding to the slit.

6. The stator according to claim 5,
wherein the rib is disposed to be capable of being visually observed via the slit when viewed from the upper connection part.

7. The stator according to claim 1,
wherein the upper connection part is connected to the winding by solder.

8. The stator according to claim 1,
wherein the lower connection part is connected to the substrate by solder.

9. The stator according to claim 8,
wherein the winding is an aluminum wire covered with a coating, and
wherein a melting point of the solder to be used for the lower connection part is lower than a melting point of the coating.

10. A motor, comprising:
a rotating shaft of a rotor;
a lead wire; and
the stator according to claim 1,
wherein
the motor is supplied with electric power via the lead wire to rotate the rotating shaft of the rotor.

11. A ventilation device, comprising:
the motor according to claim 10;
a casing including an inlet port and an outlet port; and
blades,
wherein
the ventilation device is configured to inhale air from the inlet port and discharge the air from the outlet port when the rotating shaft rotates the blades.

* * * * *